(12) United States Patent
Xu (10) Patent No.: US 11,217,279 B2
(45) Date of Patent: Jan. 4, 2022

(54) METHOD AND DEVICE FOR ADJUSTING VIDEO PLAYBACK SPEED

(71) Applicant: Hangzhou Hikvision Digital Technology Co., Ltd., Zhejiang (CN)

(72) Inventor: Jianghao Xu, Zhejiang (CN)

(73) Assignee: HANGZHOU HIKVISION DIGITAL TECHNOLOGY CO., LTD., Zhejiang (CN)

( * ) Notice: Subject to any disclaimer, the term of this patent is extended or adjusted under 35 U.S.C. 154(b) by 132 days.

(21) Appl. No.: 16/492,654

(22) PCT Filed: Mar. 1, 2018

(86) PCT No.: PCT/CN2018/077766
§ 371 (c)(1),
(2) Date: Sep. 10, 2019

(87) PCT Pub. No.: WO2018/161843
PCT Pub. Date: Sep. 13, 2018

(65) Prior Publication Data
US 2021/0142825 A1    May 13, 2021

(30) Foreign Application Priority Data
Mar. 10, 2017    (CN) .......................... 201710140357.3

(51) Int. Cl.
*G11B 27/10* (2006.01)
*G11B 27/00* (2006.01)
(Continued)

(52) U.S. Cl.
CPC .......... *G11B 27/005* (2013.01); *G11B 27/036* (2013.01); *G11B 27/10* (2013.01);
(Continued)

(58) Field of Classification Search
None
See application file for complete search history.

(56) References Cited

U.S. PATENT DOCUMENTS 7,027,713 B1    4/2006  Hallberg
7,237,254 B1    6/2007  Nosakhare
(Continued)

FOREIGN PATENT DOCUMENTS

CN    104394426 A    3/2015
CN    104602117 A    5/2015
(Continued)

OTHER PUBLICATIONS

International Search Report issued for Application No. PCT/UCN2018/077766, dated May 23, 2018, 2 pages.
(Continued)

*Primary Examiner* — Eileen M Adams
(74) *Attorney, Agent, or Firm* — Meunier Carlin & Curfman LLC (57) ABSTRACT

Disclosed is a method and apparatus for adjusting a playing speed of a video. The method for adjusting a playing speed of a video includes: after detecting a playing speed adjustment instruction of a target video, determining a target playing speed corresponding to the playing speed adjustment instruction; determining an initial frame rate of the target video, and taking the product of the initial frame rate and the target playing speed as a target parameter of the target video; processing the target video based on a preset frame number adjustment rule corresponding to a target comparison relationship; and adjusting timestamps of video frames contained in the processed target video, based on the preset target frame rate, so that the adjusted target video is played in the preset target frame rate. By applying the present solution, the adjusted target video can be played in the preset target frame rate, thus improving the display
(Continued)

quality of the video whose playing speed has been adjusted, and improving the user experience.

15 Claims, 2 Drawing Sheets

(51) Int. Cl.
    *G11B 27/036*     (2006.01)
    *H04N 5/783*     (2006.01)
    *H04N 7/01*     (2006.01)
    *H04N 19/46*     (2014.01)

(52) U.S. Cl.
    CPC ........... *H04N 5/783* (2013.01); *H04N 7/0127* (2013.01); *H04N 19/46* (2014.11)

(56) References Cited

U.S. PATENT DOCUMENTS

| | | | |
|---|---|---|---|
| 8,407,747 | B1 | 3/2013 | Inskip et al. |
| 2007/0168541 | A1* | 7/2007 | Gupta ................ G06Q 30/0242 709/231 |
| 2014/0044421 | A1* | 2/2014 | Sasaki .................... G11B 27/28 386/343 |
| 2014/0294368 | A1 | 10/2014 | Ishiwata et al. |
| 2015/0082368 | A1 | 3/2015 | Mamidwar et al. |

FOREIGN PATENT DOCUMENTS

| | | |
|---|---|---|
| CN | 104639978 A | 5/2015 |
| CN | 105049914 A | 11/2015 |

OTHER PUBLICATIONS

Extended European Search Report issued for Application No. 18763940.6, dated May 12, 2020, 10 pages.

Chia-Wen Lin et al., "MPEG Video Streaming with VCR Functionality", IEEE Transactions on Circuits and Systems for Video Technology, Institute of Electrical and Electronics Engineers, US. vol. 11, No. 3, Mar. 1, 2020, pp. 415-425.

Inoue S et al., "New Method For Variable Speed Playback For High Definition VCRs", Proceedings of the International Conference on Consumer Electronics, Rosemont, Jun. 5-7, 1991; vol. CONF. 10, pp. 132-133.

Ching-Lung Change et al., "The design of P2P-based VoD system with VCR functionality", Information Security and Intelligence Control (ISIC), 2012 International Conference On, IEEE, Aug. 14, 2012, pp. 146-151.

Raj C. et al., "Server side trick play for video streaming", Multimedia and Expo, 2009, ICME 2009, IEEE International Conference on, IEEE, Piscataway, NJ, US, Jun. 28, 2009, pp. 782-785.

* cited by examiner

METHOD AND DEVICE FOR ADJUSTING VIDEO PLAYBACK SPEED

The present application claims the priority to a Chinese patent application No. 201710140357.3 filed with China National Intellectual Property Administration on Mar. 10, 2017 and entitled "Method and apparatus for adjusting a playing speed of a video", which is incorporated herein by reference in its entirety.

TECHNICAL FIELD

The present application relates to the field of video processing technology, and in particular, to a method and apparatus for adjusting a playing speed of a video.

BACKGROUND

In recent years, with the development of electronic devices and the increase of network bandwidth, the requirements for video playing have been greatly reduced. A user can play a video on an electronic device anytime and anywhere. In the process of watching a video, the user may change a playing speed of the video, this is, adjust the playing speed of the video.

At present, a playing speed of a video is generally adjusted by adjusting a trigger frequency of a clock trigger. For example, the effect of fast playing is achieved by increasing the trigger frequency to increase the number of video frames displayed in the same time period, and the effect of slow playing is achieved by decreasing the trigger frequency to reduce the number of video frames displayed in the same time period. The above adjustment of the playing speed of the video is completed based on the playing speed changed by the user. The degrees that the user changes the playing speed of the video at different times may be different, thus the adjustment of the playing speed of the video by adjusting the trigger frequency of the clock trigger will result in that the numbers of video frames of the adjusted video displayed in equal time periods may be different. The different numbers of video frames displayed in the equal time periods will result in different display effects, which cause a poor display quality of the video whose playing speed has been adjusted, and thus a relatively poor user experience.

SUMMARY

An objective of embodiments of the present application is to provide a method and apparatus for adjusting a playing speed of a video, to improve the display quality of the video whose playing speed has been adjusted and thus improve user experience.

To achieve the above-described objective, in a first aspect, an embodiment of the present application provides a method for adjusting a playing speed of a video, including:

after detecting a playing speed adjustment instruction of a target video, determining a target playing speed corresponding to the playing speed adjustment instruction;

determining an initial frame rate of the target video, and taking the product of the initial frame rate and the target playing speed as a target parameter of the target video;

processing the target video based on a preset frame number adjustment rule corresponding to a target comparison relationship, wherein, the target comparison relationship is a comparison relationship between the target parameter and a preset target frame rate; and adjusting timestamps of video frames contained in the processed target video, based on the preset target frame rate, so that the adjusted target video is played in the preset target frame rate.

Optionally, processing the target video based on a preset frame number adjustment rule corresponding to a target comparison relationship, includes:

if the target parameter is smaller than the preset target frame rate, increasing the number of video frames in the target video based on the preset frame number adjustment rule;

if the target parameter is larger than the preset target frame rate, decreasing the number of video frames in the target video based on the preset frame number adjustment rule; and if the target parameter is equal to the preset target frame rate, retaining the number of video frames in the target video unchanged.

Optionally, increasing the number of video frames in the target video based on the preset frame number adjustment rule, includes:

calculating the number of added frames per second, wherein, the number of added frames is a difference between the preset target frame rate and the target parameter;

calculating a frame adding processing unit based on the target parameter and the number of added frames;

dividing the target video into at least one video frame group based on the frame adding processing unit;

determining target video frames from the at least one video frame group, based on the number of added frames and the frame adding processing unit; and adding a transition video frame after each determined target video frame, the transition video frame being a video frame generated based on this determined target video frame.

Optionally, calculating a frame adding processing unit based on the target parameter and the number of added frames, includes:

calculating the greatest common divisor D1 of $T1*P_m$ and $T1*\Delta P1$, wherein, T1 is the smallest natural number that allows $T1*P_m$ and $T1*\Delta P1$ to be integers at the same time, $P_m$ is the target parameter, and $\Delta P1$ is the number of the added frames; and determining $T1*P_m/D1$ as the frame adding processing unit.

Optionally, determining target video frames from the at least one video frame group, based on the number of added frames and the frame adding processing unit, includes:

for each of the at least one video frame group, determining target video frames in this video frame group by:

determining whether a first number of frames to be added is smaller than or equal to the frame adding processing unit, the first number of frames to be added being $T1*\Delta P1/D1$;

if the first number of frames to be added is smaller than or equal to the frame adding processing unit, determining the first number of video frames from this video frame group as target video frames; and if the first number of frames to be added is not smaller than or equal to the frame adding processing unit, determining all the video frames contained in this video frame group as first target video frames, updating the first number of frames to be added based on a difference between the first number of frames to be added and the frame adding processing unit, and determining whether the updated first number of frames to be added is smaller than or equal to the frame adding processing unit; if the updated first number of frames to be added is smaller than or equal to the frame adding processing unit, determining the updated first number of video frames from the video frame group as second target video frames, and determining all of the determined first target video frames and the determined second target video frames as target video frames; if the updated first number of frames to be added is not smaller than or equal to the frame adding processing unit, returning to the step of determining all the video frames contained in this video frame group as first target video frames.

Optionally, calculating a frame adding processing unit based on the target parameter and the number of added frames, includes:

calculating the greatest common divisor D2 of $P_m$ and $\Delta P1$, wherein, $P_m$ is the target parameter, and $\Delta P1$ is the number of added frames; and determining $T2*P_m/D2$ as the frame adding processing unit, wherein, T2 is the smallest natural number that allows $T2*P_m/D2$ and $T2*\Delta P1/D2$ to be integers at the same time.

Optionally, determining target video frames from the at least one video frame group, based on the number of added frames and the frame adding processing unit, includes:

for each of the at least one video frame group, determining target video frames in this video frame group by:

determining whether a second number of frames to be added is smaller than or equal to the frame adding processing unit, the second number of frames to be added being $T2*\Delta P1/D2$;

if the second number of frames to be added is smaller than or equal to the frame adding processing unit, determining the second number of video frames from this video frame group as target video frames; and if the second number of frames to be added is not smaller than or equal to the frame adding processing unit, determining all the video frames contained in this video frame group as third target video frames, updating the second number of frames to be added based on a difference between the second number of frames to be added and the frame adding processing unit, and determining whether the updated second number of frames to be added is smaller than or equal to the frame adding processing unit; if the updated second number of frames to be added is smaller than or equal to the frame adding processing unit, determining the updated second number of video frames from this video frame group as fourth target video frames, and determining all of the determined third target video frames and the determined fourth target video frames as target video frames; if the updated second number of frames to be added is not smaller than or equal to the frame adding processing unit, returning to the step of determining all the video frames contained in this video frame group as third target video frames.

Optionally, decreasing the number of video frames in the target video based on the preset frame number adjustment rule, includes:

calculating the number of removed frames per second, wherein, the number of removed frames is a difference between the preset target frame rate and the target parameter;

calculating a frame removing processing unit based on the target parameter and the number of removed frames;

dividing the target video into at least one video frame group based on the frame removing processing unit;

determining target video frames from the at least one video frame group, based on the number of removed frames and the frame removing processing unit; and removing the determined target video frames.

Optionally, calculating a frame removing processing unit based on the target parameter and the number of removed frames, includes:

calculating the greatest common divisor D3 of $T3*P_m$ and $T3*\Delta P2$; wherein, T3 is the smallest natural number that allows $T3*P_m$ and $T3*\Delta P2$ to be integers at the same time, $P_m$ is the target parameter, and $\Delta P2$ is the number of removed frames; and determining $T3*P_m/D3$ as the frame removing processing unit.

Optionally, determining target video frames from the at least one video frame group, based on the number of added frames and the frame adding processing unit, includes:

for each of the at least one video frame group, determining target video frames in this video frame group by:

determining $T3*\Delta P2/D3$ video frames from this video frame group as target video frames.

Optionally, calculating a frame removing processing unit based on the target parameter and the number of removed frames, includes:

calculating the greatest common divisor D4 of $P_m$ and $\Delta P2$, wherein, $P_m$ is the target parameter, and $\Delta P2$ is the number of removed frames; and determining $T4*P_m/D4$ as the frame removing processing unit, wherein, T4 is the smallest natural number that allows $T4*P_m/D2$ and $T4*\Delta P2/D4$ to be integers at the same time.

Optionally, determining target video frames from the at least one video frame group, based on the number of added frames and the frame adding processing unit, includes:

for each of the at least one video frame group, determining target video frames in this video frame group by:

determining $T4*\Delta P2/D4$ video frames from this video frame group as target video frames.

Optionally, the method further includes:

obtaining a target adjusted video by encoding the target video whose timestamps have been adjusted completely; and storing and/or outputting the target adjusted video.

To achieve the above-described objective, in a second aspect, an embodiment of the present application further provides an apparatus for adjusting a playing speed of a video, including:

a first determining module configured for, after a playing speed adjustment instruction of a target video is detected, determining a target playing speed corresponding to the playing speed adjustment instruction;

a second determining module, configured for determining an initial frame rate of the target video, and taking the product of the initial frame rate and the target playing speed as a target parameter of the target video;

a first processing module, configured for processing the target video based on a preset frame number adjustment rule corresponding to a target comparison relationship, wherein, the target comparison relationship is a comparison relationship between the target parameter and a preset target frame rate;

an adjusting module, configured for adjusting timestamps of video frames contained in the processed target video based on the preset target frame rate, so that the adjusted target video is played in the preset target frame rate.

Optionally, the first processing module includes:

a first processing sub-module configured for, if the target parameter is smaller than the preset target frame rate, increasing the number of video frames in the target video based on the preset frame number adjustment rule;

a second processing sub-module configured for, if the target parameter is larger than the preset target frame rate, decreasing the number of video frames in the target video based on the preset frame number adjustment rule;

a third processing sub-module configured for, if the target parameter is equal to the preset target frame rate, retaining the number of video frames in the target video unchanged.

Optionally, the first processing sub-module includes:

a first calculating unit, configured for calculating the number of added frames per second, wherein, the number of added frames is a difference between the preset target frame rate and the target parameter;

a second calculating unit, configured for calculating a frame adding processing unit based on the target parameter and the number of added frames;

a first dividing unit, configured for dividing the target video into at least one video frame group based on the frame adding processing unit;

a first determining unit, configured for determining target video frames from the at least one video frame group, based on the number of added frames and the frame adding processing unit; and a frame adding unit, configured for adding a transition video frame after each determined target video frame, the transition video frame being a video frame generated based on this determined target video frame.

Optionally, the second calculating unit is configured for:

calculating the greatest common divisor D1 of $T1*P_m$ and $T1*\Delta P1$, wherein, T1 is the smallest natural number that allows $T1*P_m$ and $T1*\Delta P1$ to be integers at the same time, $P_m$ is the target parameter, and $\Delta P1$ is the number of the added frames; and determining $T1*P_m/D1$ as the frame adding processing unit.

Optionally, the first determining unit is configured for:

for each of the at least one video frame group, determining target video frames in the video frame group by:

determining whether a first number of frames to be added is smaller than or equal to the frame adding processing unit, the first number of frames to be added being $T1*\Delta P1/D1$;

if the first number of frames to be added is smaller than or equal to the frame adding processing unit, determining the first number of video frames from this video frame group as the target video frames; and if the first number of frames to be added is not smaller than or equal to the frame adding processing unit, determining all the video frames contained in this video frame group as first target video frames, updating the first number of frames to be added based on a difference between the first number of frames to be added and the frame adding processing unit, and determining whether the updated first number of frames to be added is smaller than or equal to the frame adding processing unit; if the updated first number of frames to be added is smaller than or equal to the frame adding processing unit, determining the updated first number of video frames from this video frame group as second target video frames, and determining all of the determined first target video frames and the determined second target video frames as target video frames; if the updated first number of frames to be added is not smaller than or equal to the frame adding processing unit, returning to the step of determining all the video frames contained in the video frame group as first target video frames.

Optionally, the second calculating unit is configured for:

calculating the greatest common divisor D2 of $P_m$ and $\Delta P1$, wherein, $P_m$ is the target parameter, and $\Delta P1$ is the number of added frames; and determining $T2*P_m/D2$ as the frame adding processing unit, wherein, T2 is the smallest natural number that allows $T2*P_m/D2$ and $T2*\Delta P1/D2$ to be integers at the same time.

Optionally, the first determining unit is configured for:

for each of the at least one video frame group, determining target video frames in the video frame group by:

determining whether a second number of frames to be added is smaller than or equal to the frame adding processing unit, the second number of frames to be added being $T2*\Delta P1/D2$;

if the second number of frames to be added is smaller than or equal to the frame adding processing unit, determining the second number of video frames from this video frame group as target video frames; and if the second number of frames to be added is not smaller than or equal to the frame adding processing unit, determining all the video frames contained in this video frame group as third target video frames, updating the second number of frames to be added based on a difference between the second number of frames to be added and the frame adding processing unit, and determining whether the updated second number of frames to be added is smaller than or equal to the frame adding processing unit; if the updated second number of frames to be added is smaller than or equal to the frame adding processing unit, determining the updated second number of video frames from this video frame group as fourth target video frames, and determining all of the determined third target video frames and the determined fourth target video frames as target video frames; if the updated second number of frames to be added is not smaller than or equal to the frame adding processing unit, returning to the step of determining all the video frames contained in this video frame group as third target video frames.

Optionally, the second processing sub-module includes:

a third calculating unit, configured for calculating the number of removed frames per second, wherein, the number of removed frames is a difference between the preset target frame rate and the target parameter;

a fourth calculating unit, configured for calculating a frame removing processing unit based on the target parameter and the number of removed frames;

a second dividing unit, configured for dividing the target video into at least one video frame group based on the frame removing processing unit;

a second determining unit, configured for determining target video frames from the at least one video frame group, based on the number of removed frames and the frame removing processing unit; and a frame removing unit, configured for removing the determined target video frames.

Optionally, the fourth calculating unit is configured for:

calculating the greatest common divisor D3 of $T3*P_m$ and $T3*\Delta P2$; wherein, T3 is the smallest natural number that allows $T3*P_m$ and $T3*\Delta P2$ to be integers at the same time, $P_m$ is the target parameter, and $\Delta P2$ is the number of removed frames; and determining $T3*P_m/D3$ as the frame removing processing unit.

Optionally, the second determining unit is configured for:

for each of the at least one video frame group, determining target video frames in the video frame group by:

determining $T3*\Delta P2/D3$ video frames from this video frame group as target video frames.

Optionally, the fourth calculating unit is configured for:

calculating the greatest common divisor D4 of $P_m$ and $\Delta P2$, wherein, $P_m$ is the target parameter, and $\Delta P2$ is the number of removed frames; and determining $T4*P_m/D4$ as the frame removing processing unit, wherein, T4 is the smallest natural number that allows $T4*P_m/D2$ and $T4*\Delta P2/D4$ to be integers at the same time.

Optionally, the second determining sub-module is configured for:

for each of the at least one video frame group, determining target video frames in the video frame group by:

determining T4*ΔP2/D4 video frames from this video frame group as target video frames.

Optionally, the apparatus further includes:

an encoding module, configured for obtaining a target adjusted video by encoding the target video whose timestamps have been adjusted completely; and a second processing module, configured for storing and/or outputting the target adjusted video.

In a third aspect, an embodiment of the present application provides a storage medium for storing executable codes, wherein the executable codes perform, when executed, the method for adjusting a playing speed of a video according to the first aspect of the present application.

In a fourth aspect, an embodiment of the present application provides an application program for performing, when executed, the method for adjusting a playing speed of a video according to the first aspect of the present application.

In a fifth aspect, an embodiment of the present application provides a video playing device, including: a processor and a memory, wherein the memory stores executable program codes;

the processor, by reading the executable program codes stored in the memory, executes a program corresponding to the executable program codes, so as to perform the method for adjusting a playing speed of a video according to the first aspect of the present application.

In summary, in the solution according to the embodiment of the present application, after a playing speed adjustment instruction of a target video is detected, a target playing speed corresponding to the playing speed adjustment instruction is determined; an initial frame rate of the target video is further determined, and the product of the initial frame rate and the target playing speed is taken as a target parameter of the target video; the target video is processed based on a preset frame number adjustment rule corresponding to a target comparison relationship; timestamps of video frames contained in the processed target video are adjusted based on the preset target frame rate, so that the adjusted target video is played in the preset target frame rate. After the playing speed of the target video is adjusted by the solution of the embodiment of the present application, the adjusted target video can be played in the preset target frame rate, which can avoid that the number of video frames displayed in equal time periods is different, improve the display quality of a video whose playing speed has been adjusted, and improve the user experience.

BRIEF DESCRIPTION OF THE DRAWINGS

In order to more clearly describe the technical solutions of the embodiments of the present application or of the prior art, drawings that need to be used in embodiments and the prior art will be briefly described below. Obviously, the drawings provided below are for only some embodiments of the present application; those skilled in the art can also obtain other drawings based on these drawings without any creative efforts.

DETAILED DESCRIPTION OF THE INVENTION

In order to make the objectives, technical solutions, and advantages of the present application clearer and more understandable, the present application will be described in more detail below with reference to the appended drawings and embodiments. Obviously, the described embodiments are only some, and not all, of the embodiments of the present application. All other embodiments obtained based on the embodiments of the present application by those skilled in the art without any creative efforts fall into the scope of protection defined by the present application.

The present application will be described in detail below through specific embodiments.

In order to solve the above technical problem, embodiments of the present application provide a method and apparatus for adjusting a playing speed of a video.

A method for adjusting a playing speed of a video according to an embodiment of the present application is first introduced.

The method for adjusting a playing speed of a video according to the embodiment of the present application is applied to an electronic device. The electronic device can be a device capable of playing video, such as a smart phone, a tablet, a desktop terminal or the like. Moreover, a software for implementing the functions of the method for adjusting a playing speed of a video according to the embodiment of the present application can be a dedicated video play client, a plug-in in an existing video play client or the like, which are reasonable.

Figure 1:
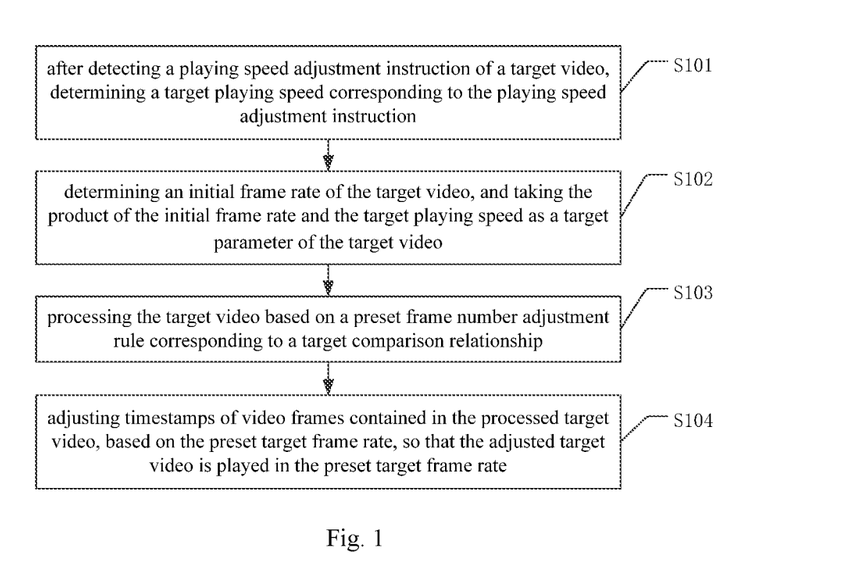
FIG. 1 is a schematic flowchart of a method for adjusting a playing speed of a video according to an embodiment of the present application.

FIG. 1 is a schematic flowchart of a method for adjusting a playing speed of a video according to an embodiment of the present application. The method includes S101-S104.

S101, after detecting a playing speed adjustment instruction of a target video, determining a target playing speed corresponding to the playing speed adjustment instruction.

Those skilled in the art can understand that one video is generally played at a certain playing speed, and the video is played at a normal playing speed by default. The default playing speed is considered to be 1. However, during or before video playing, a user can set the playing speed of the video, that is, adjust the playing speed of the video to a speed other than the default playing speed. In this way, the effect of fast playing or slow playing of the video can be achieved by adjusting the playing speed. For example, a video is played fast by adjusting the playing speed to 2.0, and a video is played slowly by adjusting the playing speed to 0.8. In the solution according to the embodiment of the present application, a video whose playing speed is adjusted is referred to as a target video. The user may set a playing speed for the target video. In the embodiment of the present application, an action that the user sets the playing speed is considered as a playing speed adjustment instruction of adjusting the playing speed of the target video, and the playing speed set by the user is referred to as a target playing speed, which can be represented by V. In the solution according to the embodiment of the present application, if the target video is opened and played according to the default playing speed, the playing speed set by the user is 1, that is, V=1.

For example, the target video is a video A. When a highlight segment of the target video is played, the user wants this highlight segment to be slowly played so that he/she can view this segment more carefully. Optionally, in order to prevent the playing speed from being adjusted too much, a range of playing speed may be set and the playing speed may be adjusted in a step size. For example, the range of the playing speed may be (0, 2.0], the default playing speed is 1, the step size of adjusting the playing speed may be set to 0.1, and the playing speed set by the user, i.e., the target speed is 0.9, i.e., V=0.9. Through the above process, it can be determined that the target playing speed V corresponding to the target video at this time is equal to 0.9, that is, the playing speed of slow playing is 0.9 times the default playing speed.

S102, determining an initial frame rate of the target video, and taking the product of the initial frame rate and the target playing speed as a target parameter of the target video.

In order to explain the embodiment of the present application more clearly, the frame rate is first introduced. The frame rate is used to indicate the number of video frames displayed per unit time, generally in seconds, that is, the number of video frames displayed per second (Frames Per Second, FPS for short). A video has been provided with a frame rate upon encoding. In the embodiment of the present application, this frame rate is referred to as an initial frame rate, which can be represented by $P_i$. For example, the frame rate corresponding to the video A is 15, that is, the initial frame rate $P_i$=15.

If the above playing speed set by the user, i.e., the target speed is 0.9, i.e., V=0.9, the product of the initial frame rate $P_i$ and the target playing speed V is 15*0.9=13.5. The product of the initial frame rate and the target playing speed is referred to as the target parameter, which can be represented by $P_m$. In other words, the target parameter is $P_m=P_i*V$.

S103, processing the target video based on a preset frame number adjustment rule corresponding to a target comparison relationship.

The target comparison relationship is a comparison relationship between the target parameter and a preset target frame rate. In general, a higher frame rate results in a smoother, more realistic play effect. However, the higher the frame rate, the higher the processing capacity requirements for the graphics processor. Furthermore, a higher frame rate may not result in the significant improved smoothness of the video playing. The two factors of the play effect and the processing capacity requirements for the graphics processor are taken into account. Generally, there is a preferable frame rate which can result in a relatively ideal play effect of the target video frame, for example, 30 frames/second. Therefore, in order to enable the frame rate of the target video whose playing speed is adjusted to reach a preferable frame rate, the preferable frame rate may be set in advance. In the embodiment of the present application, the preset preferable frame rate is a preset target frame rate, which is represented by $P_d$. The $P_d$ may be set as $P_d$=30, and the present application is not limited thereto.

Based on the preset target frame rate $P_d$, the product of the initial frame rate $P_i$ and the target playing speed V for the video A, i.e. the target parameter $P_m$, may be compared with the preset target frame rate $P_d$, to obtain a comparison relationship between $P_m$ and $P_d$. The comparison relationship may be referred to as a target comparison relationship.

The target video is processed according to a preset frame number adjustment rule corresponding to the target comparison relationship. The preset frame number adjustment rule described above is a rule set based on the target parameter and the preset target frame rate $P_d$.

For example, the step of processing the target video based on a preset frame number adjustment rule corresponding to a target comparison relationship may include:

if the target parameter is smaller than the preset target frame rate, increasing the number of video frames in the target video based on the preset frame number adjustment rule;

if the target parameter is larger than the preset target frame rate, decreasing the number of video frames in the target video based on the preset frame number adjustment rule; and if the target parameter is equal to the preset target frame rate, retaining the number of video frames in the target video unchanged.

It can be understood that if the product of the initial frame rate $P_i$ and the target playing speed V for the video A, i.e. the target parameter $P_m$, is smaller than the preset target frame rate $P_d$, it indicates that the number of video frames played per second is smaller than the number of video frames corresponding to the target frame rate. Therefore, in order to avoid the problem that the numbers of video frames displayed in equal time periods are different, it is necessary to increase the number of video frames played per second. In other words, the number of video frames in the video A may be increased according to the preset frame number adjustment rule.

If the target parameter $P_m$ is larger than the preset target frame rate $P_d$, it indicates that the number of video frames played per second is larger than the number of video frames corresponding to the target frame rate. Therefore, in order to avoid the problem that the numbers of video frames displayed in equal time periods are different, it is necessary to decrease the number of video frames played per second. In other words, the number of video frames in the video A may be decreased according to the preset frame number adjustment rule.

If the target parameter $P_m$ is equal to the preset target frame rate $P_d$, it indicates that the number of video frames played per second at this time is equal to the number of video frames corresponding to the target frame rate. Therefore, it is not necessary to increase or decrease the number of video frames in the video A, and it is only necessary to retain the number of video frames in the video A unchanged.

It can be seen that when the target parameter $P_m$ is equal to the preset target frame rate $P_d$, it is only necessary to retain the number of video frames in the video A unchanged. This case is relatively simple. For simplicity of the description, only a first case in which the target parameter $P_m$ is smaller than the preset target frame rate $P_d$ and a second case in which the target frame rate $P_m$ is larger than the preset target frame rate $P_d$ are described in detail below.

In the first case, if the target parameter is smaller than the preset target frame rate, the step of increasing the number of video frames in the target video based on the preset frame number adjustment rule may include steps A1-A5 (not shown in the figures).

A1: calculating the number of added frames per second, wherein, the number of added frames is the difference between the preset target frame rate and the target parameter.

A2: calculating a frame adding processing unit based on the target parameter and the number of added frames.

In the solution according to the embodiment of the present application, the frame adding processing unit may be calculated based on the target parameter and the number of added frames by the following two methods. The present application is not limited to the two methods.

Method 1: the step of calculating a frame adding processing unit based on the target parameter and the number of added frames may include:

calculating the greatest common divisor D1 of $T1*P_m$ and $T1*\Delta P1$; wherein, T1 is the smallest natural number that allows $T1*P_m$ and $T1*\Delta P1$ to be integers at the same time, $P_m$ is the target parameter, and $\Delta P1$ is the number of added frames; and determining $T1*P_m/D1$ as the frame adding processing unit.

For example, if the target frame rate $P_d$ is equal to 30, the initial frame rate $P_i$ corresponding to the video A is equal to 15, and the target playing speed V is equal to 0.9, the target parameter $P_m$ corresponding to the video A is equal to 13.5, i.e., $P_m=15*0.9=13.5$. Apparently, 13.5 is smaller than 30, that is, the target parameter $P_m$ is smaller than the target frame rate $P_d$. Then the number of added frames per second can be calculated, that is, $\Delta P1=P_d-P_m=30-13.5=16.5$. The process of calculating a frame adding processing unit according to the method 1 is described specifically below. The greatest common divisor D1 of $T1*P_m$ and $T1*\Delta P1$ is calculated, wherein, T1 is the smallest natural number that allows $T1*P_m$ and $T1*\Delta P1$ to be integers at the same time. As stated above, $P_m$ is equal to 13.5 and $\Delta P1$ is equal to 16.5, thus T1 which allows $T1*P_m$ and $T1*\Delta P1$ to be integers at the same time is 2, i.e. T1=2. At this time, $T1*P_m$ is 27, i.e., $T1*P_m=2*13.5=27$, and $T1*\Delta P1$ is 33, i.e., $T1*\Delta P1=2*16.5=33$. The greatest common divisor D1 of 27 and 33 is 3, i.e., D1=3. Finally, $T1*P_m/D1$ is determined as the frame adding processing unit, that is, the obtained frame adding processing unit is $2*13.5/3=9$.

Method 2: the step of calculating a frame adding processing unit based on the target parameter and the number of added frames may include:

calculating the greatest common divisor D2 of $P_m$ and $\Delta P1$, wherein, $P_m$ is the target parameter, and $\Delta P1$ is the number of added frames; and determining $T2*P_m/D2$ as the frame adding processing unit, wherein, T2 is the smallest natural number that allows $T2*P_m/D2$ and $T2*\Delta P1/D2$ to be integers at the same time.

In the solution according to the embodiment of the present application, the greatest common divisor D2 of $P_m$ and $\Delta P1$ may include the following two cases. In the first case, $P_m$ and $\Delta P1$ are integers, and at this time, the greatest common divisor D2 of $P_m$ and $\Delta P1$ is determined in the existing concept of the maximum common divisor. In the second case, at least one of $P_m$ and $\Delta P1$ is not an integer, that is, at least one of $P_m$ and $\Delta P1$ is a decimal, and at this time, the greatest common divisor D2 of $P_m$ and $\Delta P1$ may be a decimal. For example, if $P_m$ is equal to 0.9 and $\Delta P1$ is equal to 1.2, then the greatest common divisor of 0.9 and 1.2 is 0.3. For example, if $P_m$ is equal to 1.5 and $\Delta P1$ is equal to 2, then the greatest common divisor of 1.5 and 2 is 0.5.

For example, if the target frame rate $P_d$ is equal to 30, the product of the initial frame rate $P_i$ and the target playing speed V is $P_m=13.5$, then $P_m$ is smaller than $P_d$, that is, $P_m<P_d$. At this time, the calculated number of added frames per second is $\Delta P1=P_d-P_m=30-13.5=16.5$. The process of calculating the frame adding processing unit according to the method 2 is described specifically below. The greatest common divisor D2 of $P_m$ and $\Delta P1$ is calculated. As stated above, $P_m$ is equal to 13.5 and $\Delta P1$ is equal to 16.5, thus the greatest common divisor of 13.5 and 16.5 is D2=1.5, $P_m/D2$ is equal to 9, and $\Delta P1/D2$ is equal to 11. Since $P_m/D2$ and $\Delta P1/D2$ are both integers, T2 is equal to 1. Finally, $T2*P_m/D2$ is determined as a frame adding processing unit, that is, the obtained frame adding processing unit is $1*13.5/1.5=9$.

A3: dividing the target video into at least one video frame group based on the frame adding processing unit.

The video frames contained in the video A may be divided according to the obtained frame adding processing unit. Taking the frame adding processing unit which is equal to 9 as an example. Specifically, the video A is divided from the $1^{st}$ frame in the video A, and 9 video frames constitute one video frame group, for example, video frame group 1 includes video frames 1-9, video frame group 2 includes video frames 10-18, and so on. If the number of the last remaining video frames is smaller than 9, then all the remaining video frames are divided into one video frame group. If the video A contains 60,000 video frames, then the number of the last remaining video frames is 4, which is smaller than 9, and thus the last four video frames are divided into one video frame group. Alternatively, the last remaining four video frames may be discarded, which is also reasonable. Therefore, after the video frames in the target video is divided, at least one video frame group can be obtained.

The above-mentioned target video, the number of video frames contained in the target video, the size of the frame adding processing unit, and the size of the target frame rate $P_d$ are only a specific example of the embodiment of the present application. The embodiment of the present application does not specifically limit the target video, the number of video frames contained in the target video, the size of the frame adding processing unit, and the size of the target frame rate $P_d$.

A4: determining target video frames from the at least one video frame group, based on the number of added frames and the frame adding processing unit.

For the above two different methods, there are two specific implementations of determining target video frames from the at least one video frame group based on the number of added frames and the frame adding processing unit.

For the method one in the foregoing step A2, the step of determining target video frames from the at least one video frame group based on the number of added frames and the frame adding processing unit may include:

for each of the at least one video frame group, determining target video frames in this video frame group by:

determining whether the first number of frames to be added is smaller than or equal to the frame adding processing unit, the first number of frames to be added being $T1*\Delta P1/D1$;

if the first number of frames to be added is smaller than or equal to the frame adding processing unit, determining the first number of video frames from this video frame group as target video frames; and if the first number of frames to be added is not smaller than or equal to the frame adding processing unit, determining all video frames contained in this video frame group as first target video frames, and updating the first number of frames to be added based on the difference between the first number of frames to be added and the frame adding processing unit, and determining whether the updated first number of frames to be added is smaller than or equal to the frame adding processing unit; if the updated first number of frames to be added is smaller than or equal to the frame adding processing unit, determining the updated first number of video frames from this video frame group as second target video frames, and determining all of the determined first target video frames and the determined second target video frames as target video frames; if the updated first number of frames to be added is not smaller than or equal to the frame adding processing unit, returning to the step of determining all the video frames contained in this video frame group as first target video frames.

Since the video frame groups are identical in form, the process of determining the target video frames from each of the video frame groups is the same. Therefore, one video frame group of multiple video frame groups is taken as an example for description hereafter.

Example 1: as stated above, the frame adding processing unit is equal to 9, $T1*\Delta P1$ is equal to 33, the greatest common divisor D1 of $T1*P_m$ and $T1*\Delta P1$ is 3. At this time, $T1*\Delta P1/D1$ is taken as the first number of frames to be added (represented by H), that is, H=33/3=11. In other words, 11 video frames are to be determined from the video frame group 200 as the target video frames. In the following embodiments, the frame adding processing unit may be represented by G.

It can be seen that if H is larger than G, i.e., H>G, all the nine video frames contained in the video frame group 200 are determined as the first target video frames. At this time, nine first target video frames have been determined as nine target video frames. In other words, it is still necessary to determine H−G=11−9=2 target video frames, and H-G is taken as the new first number of frames to be added (represented by H1), that is, H1=2. At this time, if H1 is larger than G, i.e., H1<G, it is necessary to determine H1 video frames from the video frame group 200 as second target video frames, that is, determine 2 video frames from the 9 video frames as the second target video frames. There are various ways of determining 2 video frames from the 9 video frames as the second target video frames. For example, 2 video frames may be selected randomly from 9 video frames. Alternatively, video frames which are located in two preset locations in the video frame group may be selected. For example, the preset locations are the first and last locations in the video frame group, or the first and the fifth locations in the video frame group, or the fifth and the last locations in the video frame group, which are all reasonable.

However, in order to ensure that the target video frames determined from the video frame group are evenly distributed and thus ensure the accuracy of adjusting the playing speed of the target video, the embodiment of the present application provides a specific implementation, that is, determining a second target video frame(s) from the video frame group according to a certain step size. In this embodiment, since two video frames are to be determined from the video frame group 200 as the second target video frames, the step size may be set as G/H1. Since the step size is generally an integer, G/H1 can be rounded. To ensure that a sufficient number of target video frames can be obtained, G/H1 may be rounded down, e.g., $\lfloor G/H1 \rfloor$. Therefore, the step size may be set as $\lfloor 9/2 \rfloor = 4$. If the $1^{st}$ video frame in the two video frames is the $1^{st}$ video frame in the video frame group 200, the $5^{th}$ video frame, i.e., the $(1+4)^{th}$ video frame in the video frame group 200 may be determined as the $2^{nd}$ video frame in the two video frames. In this way, the $1^{st}$ and $5^{th}$ video frames in the video frame group 200 are then determined as the second target video frames. Therefore, 9 first target video frames and 2 second target video frames are obtained, that is, each of the first and fifth video frames in the video frame group 200 is selected as two target video frames, and each of the other video frames in the video frame group 200 is selected once as one target video frame. Thus, a total of 11 target video frames are obtained.

In the embodiment of the present application, the "first" and "second" in the first target video frame and the second target video frame are used to indicate target video frames in different processes, and do not distinguish the form of the target video frames. All the target video frames are identical in form.

Example 2: the frame adding processing unit G is 9, $T1*\Delta P1$ is 12, the greatest common divisor D1 of $T1*P_m$ and $T1*\Delta P1$ is 3. At this time, $T1*\Delta P1/D1$ is taken as the first number of frames to be added (represented by H), that is, H=12/3=4. In other words, 4 video frames are to be determined from the 9 video frames in the video frame group 200 as the target video frames.

It can be seen that H is smaller than G, i.e., H<G, thus it is necessary to determine 4 video frames from the 9 video frames of the video frame group 200 as the target video frames, and they also may be selected according to a certain step size. The step size may be determined by rounding down G/H1, i.e. $\lfloor G/H1 \rfloor$. Therefore, the step size can be set to $\lfloor 9/4 \rfloor = 2$. If the first video frame in the video frame group 200 is determined as the first target video frame, the $3^{rd}$, i.e., $(1+2)^{rd}$, the $5^{th}$, i.e., $(3+2)^{th}$, and the $7^{th}$, i.e., $(5+2)^{th}$ video frames in the video frame group 200 may be determined as the remaining second to fourth target video frames, respectively. In this way, 4 target video frames can be determined. Of course, if the $1^{st}$ target video frame is the $2^{nd}$ video frame in the video frame group, the remaining second-fourth target video frames are the $4^{th}$, i.e., $(2+2)^{th}$, the $6^{th}$, i.e., $(4+2)^{th}$, and the $8^{th}$, i.e., $(6+2)^{th}$ video frames in the video frame group 200, respectively.

Example 3: the frame adding processing unit G is 9, $T1*\Delta P1$ is 60, and the greatest common divisor D1 of $T1*P_m$ and $T1*\Delta P1$ is 3. At this time, $T1*\Delta P1/D1$ is taken as the first number of frames to be added (represented by H), that is, H=60/3=20. In other words, 20 video frames are to be determined from the 9 video frames in the video frame group 200 as the target video frames.

It can be seen that H is larger than G, i.e., H>G, thus all the 9 video frames contained in the video frame group 200 need to be determined as the first target video frame. At this time, 9 first target video frames have been determined, and it is necessary to further determine H−G=20−9=11 target video frames. H-G is taken as the new first number of frames to be added (represented by H1), that is, H1=11. At this time, it is determined whether the current number of frames to be added is smaller than or equal to the frame adding processing unit. In other words, it is determined whether the new first number of frames to be added H1 is smaller than or equal to the frame adding processing unit G. Since H1 is larger than G, i.e., H1>G, the step of determining all the video frames contained in the video frame group as the first target video frames is performed, that is, all of the 9 video frames contained in the video frame group 200 are determined as the first target video frames again. Thus, 9 further first target video frames can be determined. At this time, a total of 9+9=18 first target video frames are determined. The difference between the current first number of frames to be added H1 and the frame adding processing unit G is H1−G=11−9=2, and H1-G is taken as the new first number of frames to be added (represented by H2 at this time), i.e., H2=H1−G=11−9=2. In other words, it is necessary to determine 2 further video frames from the 9 video frames contained in the video frame group 200 as second target video frames. Finally, 18 first target video frames and 2 second target video frames are determined. The first target video frames and the second target video frames are target video frames, thus a total of 20 target video frames are determined.

For the method 2 in the above-described step A2, the step of determining target video frames from the at least one video frame group, based on the number of added frames and the frame adding processing unit, may include:

for each of the at least one video frame group, determining target video frames in this video frame group by:

determining whether the second number of frames to be added is smaller than or equal to the frame adding processing unit, the second number of frames to be added being $T2*\Delta P1/D2$;

if the second number of frames to be added is smaller than or equal to the frame adding processing unit, determining the second number of video frames from this video frame group as the target video frames; and if the second number of frames to be added is not smaller than or equal to the frame adding processing unit, determining all the video frames contained in this video frame group as third target video frames, and updating the second number of frames to be added based on the difference between the second number of frames to be added and the frame adding processing unit; and determining whether the updated second number of frames to be added is smaller than or equal to the frame adding processing unit; if the updated second number of frames to be added is smaller than or equal to the frame adding processing unit, determining the updated second number of video frames from this video frame group as fourth target video frames, and determining all of the determined third target video frames and the determined fourth target video frames as target video frames; if the updated second number of frames to be added is not smaller than or equal to the frame adding processing unit, returning to the step of determining all the video frames contained in this video frame group as third target video frames.

Because this process is similar to the method 1 in the above-described step A2, with the difference in the representation of the number of frames to be added, those contents will be no longer repeated in the embodiment of the present application, and the related contents can refer to the above-described corresponding description.

In addition to the above two methods, determining target video frames from at least one video frame group based on the number of added frames and the frame adding processing unit may include: determining randomly video frames from each of the at least one video frame group, wherein the number of these video frames is equal to the number of added frames. For example, if the frame adding processing unit is 6 and the number of added frames is 3, 3 video frames can be randomly selected from a video frame group including 6 video frames as target video frames.

Those skilled in the art can understand, a video has key frames during encoding and decoding. The key frames can be encoded and decoded without referencing other video frames and have relatively much content information. Therefore, when the frame adding processing unit is far larger than the number of added frame, video frames may be selected from multiple key frames of a video frame group as target video frames, wherein the number of these video frames is equal to the number of added frames.

Of course, the above examples are merely some examples of various methods of determining target video frames according to embodiments of the present application. In the embodiments of the present application, the specific method of determining target video frames is not further limited.

A5: adding a transition video frame after each determined target video frame, the transition video frame being a video frame generated based on this determined target video frame.

After a target video frame is determined, a corresponding transition video frame can be generated based on the determined target video frame. Specifically, the transition video frame is obtained by directly copying the target video frame. Alternatively, on the basis of the target video frame, a new video frame is obtained by combining the target video frame with a next video frame of the target video frame by averaging and weighting their pixel values, as the transition video frame. Embodiments of the present application do not limit, in any way, the process of generating a transition video frame based on a target video frame.

After a transition video frame is generated, the generated transition video frame is added to the target video frame, so as to complete the adjustment to the number of video frames in the target video.

Case 2: the step of, if the target parameter is larger than the preset target frame rate, decreasing the number of video frames in the target video based on the preset frame number adjustment rule, may include steps B1-B5 (not shown in the drawings).

B1: calculating the number of removed frames per second, wherein, the number of removed frames is equal to the difference between the target parameter and the preset target frame rate.

B2: calculating a frame removing processing unit based on the target parameter and the number of removed frames.

In the solution according to an embodiment of the present application, a frame removing processing unit may be calculated by the following two methods based on the target parameter and the number of removed frames.

Method 1: the step of calculating a frame removing processing unit based on the target parameter and the number of removed frames may include:

calculating the greatest common divisor D3 of $T3*P_m$ and $T3*\Delta P2$; wherein, T3 is the smallest natural number that allows $T3*P_m$ and $T3*\Delta P2$ to be integers at the same time, $P_m$ is the target parameter, and $\Delta P2$ is the number of removed frames; and determining $T3*P_m/D3$ as the frame removing processing unit.

This process is the same as the process of determining the frame adding processing unit in the method one in step A2 of the above-described case 1. For example, if the target frame rate $P_d$ is 30, the initial frame rate $P_i$ corresponding to the video A is 25, and the target playing speed V is 1.9, the target parameter $P_m$ corresponding to the video A is 47.5, i.e., $P_m=25*1.9=47.5$. Apparently, 47.5 is larger than 30, that is, 47.5>30. Thus, the number of removed frames per second can be calculated, i.e., $\Delta P2=P_m-P_d=47.5-30=17.5$. Specifically, the process of calculating a frame removing processing unit according to the method 1 is as follows. The greatest common divisor D3 of $T3*P_m$ and $T3*\Delta P2$ is calculated, wherein, T3 is the smallest natural number that allows $P_m$ and $\Delta P2$ to be integers at the same time. As stated above, $P_m$ is 47.5 and $\Delta P2$ is 17.5, thus the smallest natural number T3 that allows $P_m$ and $\Delta P1$ to be integers at the same time is 2, i.e., T3=2. Accordingly, $T3*P_m$ is 95, i.e., $T3*P_m=2*47.5=95$, and $T3*\Delta P2$ is 35, i.e., $T3*\Delta P2=2*17.5=35$, and thus the greatest common divisor D3 of 95 and 35 is 5, i.e., D3=5. Finally, $T3*P_m/D3$ is determined as the frame removing processing unit, that is, the obtained frame removing processing unit is $2*47.5/5=19$.

Method 2: the step of calculating a frame decreasing processing unit based on the target parameter and the number of removed frames may include:

calculating the greatest common divisor D4 of $P_m$ and $\Delta P2$, wherein, $P_m$ is the target parameter, and $\Delta P2$ is the number of removed frames; and determining $T4*P_m/D4$ as the frame removing processing unit, wherein, T4 is the smallest natural number that allows $T4*P_m/D2$ and $T4*\Delta P2/D4$ to be integers at the same time.

In the solution according to the embodiment of the present application, the calculating of the greatest common divisor D4 of $P_m$ and $\Delta P2$ may include the following two cases. In one case, both $P_m$ and $\Delta P2$ are integers. In this case, the greatest common divisor D4 of $P_m$ and $\Delta P2$ is determined in the existing concept of greatest common divisor. In the other case, at least one of $P_m$ and $\Delta P2$ is not an integer, i.e., at least one of $P_m$ and $\Delta P2$ is a decimal. In this case, the greatest common divisor of $P_m$ and $\Delta P2$ may be a decimal. For example, if $P_m$ is 0.9 and $\Delta P2$ is 1.2, the greatest common divisor of 0.9 and 1.2 is 0.3. For another example, if $P_m$ is 7.5 and $\Delta P2$ is 5, the greatest common divisor of 7.5 and 5 is 2.5.

For example, if the target frame rate $P_d$ is 30, and the product $P_m$ of the initial frame rate $P_i$ and the target playing speed V is 47.5, then $P_m$ is larger than $P_d$, i.e., $P_m > P_d$. Therefore, the number of removed frames per second is calculated, i.e., $\Delta P2 = P_m - P_d = 47.5 - 30 = 17.5$. Specifically, the process of calculating a frame removing processing unit according to the method 2 is as follows. The greatest common divisor D4 of $P_m$ and $\Delta P2$ is calculated. As stated above, $P_m$ is 47.5 and $\Delta P2$ is 17.5, thus the greatest common divisor of 47.5 and 17.5 is 2.5. Accordingly, $P_m/D4$ is 19 and $\Delta P2/D4$ is 7. Since both $P_m/D4$ and $\Delta P2/D4$ are integers, T4 is 1. Finally, $T4*P_m/D4$ is determined as the frame removing processing unit. In other words, the obtained frame removing processing unit is $1*47.5/2.5=19$.

B3: dividing the target video into at least one video frame group based on the frame removing processing unit.

As stated above, the frame removing processing unit is determined as 19. The 60000 video frames contained in the video A may be divided into video frame groups, and each of the video frame groups includes 19 video frames. This process is completely similar to the dividing process of video frame groups in A3 in the above-described case 1, which will not be described here.

B4: determining target video frames from the at least one video frame group, based on the number of removed frames and the frame removing processing unit.

For the above-described two different methods, the determining of target video frames from the at least one video frame group based on the number of removed frames and the frame removing processing unit may be implemented by the following two ways.

For the method 1 in the above-described step B2, the step of determining target videos frames from the at least one video frame group based on the number of removed frames and the frame removing processing unit, may include:

for each of the at least one video frame group, determining target video frames in this video frame group by:

determining $T3*\Delta P2/D3$ video frames from the video frame group as target video frames.

Because video frame groups are identical in form, the process of determining the target video frames in each of the video frame groups is the same. Therefore, any one video frame group of multiple video frame groups is taken as an example for description hereafter.

Example 4: the frame removing processing unit is equal to 19, $T3*\Delta P2$ is equal to 35, and the greatest common divisor D3 of $T3*P_m$ and $T3*\Delta P2$ is equal to 5. At this time, $T3*\Delta P2/D3$ is taken as the first number of frames to be removed (which may be denoted by K), that is, $K=35/5=7$. In other words, it is necessary to determine 7 video frames from 19 video frames in the video frame group 200 as target video frames. In the following embodiment, the frame removing processing unit may be denoted by F.

There are various ways of determining 7 video frames from a video frame group containing 19 video frames. To determine the target video frames, which are distributed evenly as much as possible, from the video frame group, the target video frames may be determined from the video frame group in a certain step size. In the embodiment, since 7 video frames are to be determined from the video frame group 200 as target video frames, a step size may be set as F/K. As the step size is generally an integer, F/K can be rounded. In order to ensure that the sufficient number of target video frames is obtained, F/K may be rounded down, for example, $\lfloor F/K \rfloor$. Therefore, the step size may be set as $\lfloor 19/7 \rfloor = 2$. If the first video frame in the video frame group 200 is determined as the first target video frame, the $3^{rd}$ i.e., $(1+2)^{rd}$, the $5^{th}$ i.e., $(3+2)^{th}$, the $7^{th}$ i.e., $(5+2)^{th}$, the $9^{th}$ i.e., $(7+2)^{th}$, the $11^{th}$ i.e., $(9+2)^{th}$, and the $13^{th}$ i.e., $(11+2)^{th}$ video frames in the video frame group 200 may be determined as the second to seventh target video frames, respectively. Therefore, the first, third, fifth, seventh, ninth, eleventh and thirteenth video frames in the video frame group 200 may be determined as target video frames.

For the method 2 in the above-described B2, the step of determining target video frames from the at least one video frame group, based on the number of removed frames and the frame removing processing unit, may include:

for each of the at least one video frame group, determining target video frames in this video frame group in the following way:

determining $T4*\Delta P2/D4$ video frames from this video frame group as target video frames.

As this process is similar to the corresponding step of the method 1 in the above-described step B2, with the only difference in the representation of the number of frames to be removed. Therefore, those contents are not repeated in the embodiment of the present application.

B5: removing the determined target video frames.

After the target video frames are determined in the above-described step B4, the determined target video frames are removed, so as to complete the adjustment of the number of video frames in the target video.

It should be noted that, for the above-described step B4, in addition to the two ways of determining target video frames for the method 1 and method 2, the step of determining target video frames from the at least one video frame group, based on a second preset determining rule, may include:

For each of at least one video frame group, determining $F-T3*\Delta P2/D3$ or $F-T4*\Delta P2/D4$ video frames from this video frame group as target video frames.

Based on this process, after the target video frames are determined, the determined target video frames constitute a new video frame group. In other words, the new video frame group includes $F-T3*\Delta P2/D3$ or $F-T4*\Delta P2/D4$ video frames, the number of which is the same as the number of video frames in a video frame group formed by the remaining video frames of a video frame group including F video frames after removing $T4*\Delta P2/D4$ video frames from this video frame group including F video frames. Therefore, the step B5 of deleting the determined target video frames is no longer needed.

Example 5: the frame removing processing unit is equal to 19, $T3*\Delta P2$ is 35, and the greatest common divisor D3 of $T3*P_m$ and $T3*\Delta P2$ is 5. At this time, it is necessary to determine $F-T3*\Delta P2/D3=19-7=12$ video frames from 19 video frames in the video frame group 200 as the target video frames. There are various ways of determining 12 video frames from the 19 video frames, which is similar to the above process and is not described in detail herein. Generally, in order to obtain target video frames distributed more evenly, the target video frames may be determined from a video frame group in a certain step size. In the embodiment, since the 12 video frames are to be determined from the 19 video frames of the video frame group 200, the step size may be set to 19/12. Since the step size is generally an integer, the 19/12 is rounded. Here, the 19/12 may be rounded up, that is, $\lceil 19/12 \rceil = 2$. The $1^{st}$, $3^{rd}$, $5^{th}$, $7^{th}$, $9^{th}$, $11^{th}$, $13^{th}$, $15^{th}$, $17^{th}$, $19^{th}$ video frames in the 19 video frames in the video frame group 200 are taken as the target video frames, that is, a total of 10 target video frames is obtained. Since it is necessary to determine 12 video frames as the target video frames, it is also necessary to determine 2 video frames from the remaining video frames in the video frame group 200. At this time, there are 9 remaining video frames in the video frame group 200. These 9 video frames are considered as a remaining video frame group 200', and the 9 video frames in the remaining video frame group 200' are the $2^{nd}$, $4^{th}$, $6^{th}$, $8^{th}$, $10^{th}$, $12^{th}$, $14^{th}$, $16^{th}$, and $18^{th}$ video frames in the video frame group 200, respectively. In other words, it is necessary to determine the 2 video frames from the 9 video frames contained in the remaining video frame group 200' as the target video frames. Similarly, the 2 video frames may be determined from the 9 video frames in a certain step size, and 9/2 may be rounded up, that is, $\lceil 9/2 \rceil = 5$. At this time, the $1^{st}$ video frame and the $6^{th}$ i.e., $(1+5)^{th}$ video frames may be determined from the remaining video frame group 200' as the target video frames, or the $2^{nd}$ video frame and the $7^{th}$ i.e., $(2+5)^{th}$ video frames are determined as the target video frames, or the like. Assuming the $1^{st}$ and $6^{th}$ video frames are determined from the remaining video frame group 200' as the target video frames, that is, the $2^{nd}$ and $12^{th}$ video frames in the video frame group 200 are taken as the target video frames. At this time, a total of 12, i.e., (10+2) target video frames are obtained. The 12 target video frames are the $1^{st}$, $2^{nd}$, $3^{rd}$, $5^{th}$, $7^{th}$, $9^{th}$, $11^{th}$, $12^{th}$, $13^{th}$, $15^{th}$, $17^{th}$, $19^{th}$ video frames in the video frame group 200, respectively.

After the 12 target video frames is determined, the 12 target video frames reconstitute a new video frame group. In the above manner, all the video frame groups including 19 video frames can be adjusted to new video frame groups that include 12 video frames, which can be considered as removing 7 video frames from each video frame group. All new video frame groups will form a new video, that is, the target video in which the number of video frames has been adjusted.

S104, adjusting timestamps of video frames contained in the processed target video, based on the preset target frame rate, so that the adjusted target video is played in the preset target frame rate.

It is should be understand that after the above-mentioned adjustment of the number of video frames of the target video, the number of video frames contained in the target video may change. Take the decreasing of the number of video frames as an example. Assuming that the video A contains 60,000 video frames, an initial frame rate corresponding to the Video A is Pi=25, and the target playing speed V=1.9. Based on the frame removing processing unit being 19, the 60,000 video frames are divided into 3157 video frame groups. At this time, 17 remaining video frames, which are not grouped, exists in the 60,000 video frames. The 17 remaining video frames are discarded. Through the above calculation process, each of the 3157 video frame groups can be adjusted to a new video frame group containing 12 video frames. Thus, the adjusted target video contains 3157*12=37884 video frames. Before the target video is adjusted, the initial frame rate of the target video is $P_i=25$. Thus, in order to play the adjusted video A at a fixed frame rate (target frame rate $P_d=30$), it is necessary to adjust the timestamps of the 37884 video frames.

When the degrees of change in a video playing speed of a certain video at different times are different, the result is obtained with the method according to the embodiment of the present application: the number of video frames displayed in the equal time period will be the same, so as to improve display quality.

In summary, in the solution according to the embodiment of the present application, after detecting a playing speed adjustment instruction of a target video, a target playing speed corresponding to the playing speed adjustment instruction is determined; an initial frame rate of the target video is further determined, and the product of the initial frame rate and the target playing speed is taken as a target parameter of the target video; the target video is processed based on a preset frame number adjustment rule corresponding to a target comparison relationship; timestamps of video frames contained in the processed target video are adjusted based on the preset target frame rate, so that the adjusted target video is played in the preset target frame rate. After the playing speed of the target video is adjusted by the solution of the embodiment of the present application, the adjusted target video can be played in the preset target frame rate, which can avoid that the number of video frames displayed in equal time periods is different, improve the display quality of a video after its playing speed is adjusted, and improve the user experience.

Figure 2:
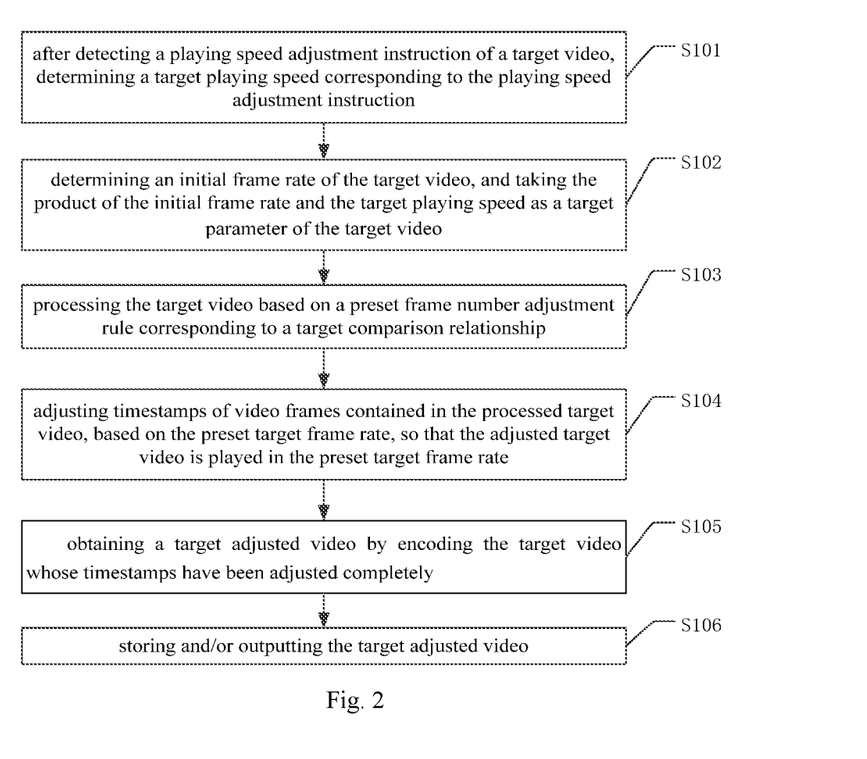
FIG. 2 is a schematic flowchart of a method for adjusting a playing speed of a video according to another embodiment of the present application.

FIG. 2 is a schematic flowchart of a method for adjusting a playing speed of a video according to another embodiment of the present application. The method further includes steps S105-S106, in addition to steps S101-104 in the embodiment of FIG. 1.

S105: encoding the target video whose timestamps has been adjusted completely, to obtain a target adjusted video.

Since the adjustment of the number of video frames of the target video is based on the target playing speed, the adjusted target video is played in the target playing speed. If the target video is directly closed, when a user opens the target video next time, the target video will be played in a playing speed that has not been adjusted. If the user wants to play the target video in the previous target playing speed, the user needs to input the target playing speed again and the target video needs to be re-adjusted. In this way, the speed of opening the target video is slow and the user has to wait for a long time.

In view of the above problem, in an optional solution according to the embodiment of the present application, the target video whose timestamps have been adjusted can be encoded to obtain a target adjusted video. The encoding here refers to video encoding. The so-called video encoding refers to compressing and encapsulating video frames through a specific compression technique to obtain a target adjusted video. When the video encoding is performed, information on the currently set video playing speed V may be written into the target adjusted video, so as to inform the user of the current video playing speed V when the target adjusted video is played again. For example, the target video whose timestamps have been adjusted completely may be encoded by an encoding standard including, but not limited to, H.264 or HEVC (High Efficiency Video Coding).

S106, storing and/or outputting the target adjusted video.

In order to facilitate the sharing and management of resources, the target adjusted video obtained above may be stored locally, or directly output to other video players or video playing devices, or stored locally and then output to other video players or video playing devices.

In summary, by applying the embodiment provided in FIG. 2, the target video whose timestamps have been adjusted completely can be re-encoded for further storage and output. In this way, when the user opens the target adjusted video next time, the last adjusted effect can be directly obtained without adjusting the target video, which is very convenient for the user, and thus improve the user experience.

Corresponding to the above method embodiment, an embodiment of the present application further provides an apparatus for adjusting a playing speed of a video.

Figure 3:
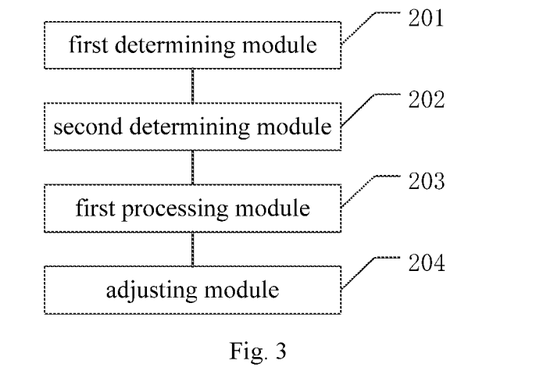
FIG. 3 is a schematic structural diagram of an apparatus for adjusting a playing speed of a video according to an embodiment of the present application.

FIG. 3 is a schematic structural diagram of an apparatus for adjusting a playing speed of a video according to an embodiment of the present application. The apparatus includes a first determining module 201, a second determining module 202, a first processing module 203 and an adjusting module 204.

The first determining module 201 is configured for, after a playing speed adjustment instruction of a target video is detected, determining a target playing speed corresponding to the playing speed adjustment instruction.

The second determining module 202 is configured for determining an initial frame rate of the target video, and taking the product of the initial frame rate and the target playing speed as a target parameter of the target video.

The first processing module 203 is configured for processing the target video based on a preset frame number adjustment rule corresponding to a target comparison relationship, wherein, the target comparison relationship is a comparison relationship between the target parameter and a preset target frame rate.

The adjusting module 204 is configured for adjusting timestamps of video frames contained in the processed target video based on the preset target frame rate, so that the adjusted target video is played in the preset target frame rate.

In summary, in the solution according to the embodiment of the present application, after a playing speed adjustment instruction of a target video is detected, a target playing speed corresponding to the playing speed adjustment instruction is determined; an initial frame rate of the target video is further determined, and the product of the initial frame rate and the target playing speed is taken as a target parameter of the target video; the target video is processed based on a preset frame number adjustment rule corresponding to a target comparison relationship; timestamps of video frames contained in the processed target video are adjusted based on the preset target frame rate, so that the adjusted target video is played in the preset target frame rate. After the playing speed of the target video is adjusted by the solution of the embodiment of the present application, the adjusted target video can be played in the preset target frame rate, which can avoid that the number of video frames displayed in equal time periods is different, improve the display quality of a video whose playing speed has been adjusted, and improve the user experience.

Optionally, the first processing module 203 may include:

a first processing sub-module configured for, if the target parameter is smaller than the preset target frame rate, increasing the number of video frames in the target video based on the preset frame number adjustment rule;

a second processing sub-module configured for, if the target parameter is larger than the preset target frame rate, decreasing the number of video frames in the target video based on the preset frame number adjustment rule; and a third processing sub-module configured for, if the target parameter is equal to the preset target frame rate, retaining the number of video frames in the target video unchanged.

In one hand, the first processing sub-module may include a first calculating unit, a second calculating unit, a first dividing unit, a first determining unit and a frame adding unit (not shown in the figures).

The first calculating unit is configured for calculating the number of added frames per second, wherein, the number of added frames is a difference between the preset target frame rate and the target parameter.

The second calculating unit is configured for calculating a frame adding processing unit based on the target parameter and the number of added frames.

The first dividing unit is configured for dividing the target video into at least one video frame group based on the frame adding processing unit.

The first determining unit is configured for determining target video frames from the at least one video frame group, based on the number of added frames and the frame adding processing unit.

The frame adding unit is configured for adding a transition video frame after each determined target video frame, the transition video frame being a video frame generated based on this determined target video frame.

In a first specific implementation, the second calculating unit may be configured for:

calculating the greatest common divisor D1 of $T1*P_m$ and $T1*\Delta P1$, wherein, T1 is the smallest natural number that allows $T1*P_m$ and $T1*\Delta P1$ to be integers at the same time, $P_m$ is the target parameter, and $\Delta P1$ is the number of the added frames; and determining $T1*P_m/D1$ as the frame adding processing unit.

Based on the first specific implementation of the second calculating unit, the first determining unit may be configured used for:

for each of the at least one video frame group, determining target video frames in the video frame group by:

determining whether a first number of frames to be added is smaller than or equal to the frame adding processing unit, the first number of frames to be added being $T1*\Delta P1/D1$;

if the first number of frames to be added is smaller than or equal to the frame adding processing unit, determining the first number of video frames from this video frame group as the target video frames; and if the first number of frames to be added is not smaller than or equal to the frame adding processing unit, determining all the video frames contained in this video frame group as first target video frames, updating the first number of frames to be added based on a difference between the first number of frames to be added and the frame adding processing unit, and determining whether the updated first number of frames to be added is smaller than or equal to the frame adding processing unit; if the updated first number of frames to be added is smaller than or equal to the frame adding processing unit, determining the updated first number of video frames from this video frame group as second target video frames, and determining all of the determined first target video frames and the determined second target video frames as target video frames; if the updated first number of frames to be added is not smaller than or equal to the frame adding processing unit, returning to the step of determining all the video frames contained in this video frame group as first target video frames.

In a second specific implementation, the second calculating unit may be configured for:

calculating the greatest common divisor D2 of $P_m$ and $\Delta P1$, wherein, $P_m$ is the target parameter, and $\Delta P1$ is the number of added frames; and determining $T2*P_m/D2$ as the frame adding processing unit, wherein, T2 is the smallest natural number that allows $T2*P_m/D2$ and $T2*\Delta P1/D2$ to be integers at the same time.

Based on the second specific implementation of the second calculating unit, the first determining unit may be configured for:

for each of the at least one video frame group, determining target video frames in the video frame group by:

determining whether a second number of frames to be added is smaller than or equal to the frame adding processing unit, the second number of frames to be added being $T2*\Delta P1/D2$;

if the second number of frames to be added is smaller than or equal to the frame adding processing unit, determining the second number of video frames from this video frame group as target video frames; and if the second number of frames to be added is not smaller than or equal to the frame adding processing unit, determining all the video frames contained in this video frame group as third target video frames, updating the second number of frames to be added based on a difference between the second number of frames to be added and the frame adding processing unit, and determining whether the updated second number of frames to be added is smaller than or equal to the frame adding processing unit; if the updated second number of frames to be added is smaller than or equal to the frame adding processing unit, determining the updated second number of video frames from this video frame group as fourth target video frames, and determining all of the determined third target video frames and the determined fourth target video frames as target video frames; if the updated second number of frames to be added is not smaller than or equal to the frame adding processing unit, returning to the step of determining all the video frames contained in this video frame group as third target video frames.

In the other hand, the second processing sub-module may include a third calculating unit, a fourth calculating unit, a second dividing unit, a second determining unit, and a frame removing unit (not shown in the figures).

The third calculating unit is configured for calculating the number of removed frames per second, wherein, the number of removed frames is a difference between the preset target frame rate and the target parameter.

The fourth calculating unit is configured for calculating a frame removing processing unit based on the target parameter and the number of removed frames.

The second dividing unit is configured for dividing the target video into at least one video frame group based on the frame removing processing unit.

The second determining unit is configured for determining target video frames from the at least one video frame group, based on the number of removed frames and the frame removing processing unit.

The frame removing unit is configured for removing the determined target video frames.

In a first specific implementation, the fourth calculating unit may be configured for:

calculating the greatest common divisor D3 of $T3*P_m$ and $T3*\Delta P2$; wherein, T3 is the smallest natural number that allows $T3*P_m$ and $T3*\Delta P2$ to be integers at the same time, $P_m$ is the target parameter, and $\Delta P2$ is the number of removed frames; and determining $T3*P_m/D3$ as the frame removing processing unit.

Based on the first implementation of the fourth calculating unit, the second determining unit may be configured for:

for each of the at least one video frame group, determining target video frames in the video frame group by:

determining $T3*\Delta P2/D3$ video frames from this video frame group as target video frames.

In the second specific implementation, the fourth calculating unit may be configured for:

calculating the greatest common divisor D4 of $P_m$ and $\Delta P2$, wherein, $P_m$ is the target parameter, and $\Delta P2$ is the number of removed frames; and determining $T4*P_m/D4$ as the frame removing processing unit, wherein, T4 is the smallest natural number that allows $T4*P_m/D2$ and $T4*\Delta P2/D4$ to be integers at the same time.

Based on the second implementation of the fourth calculating unit, the second determining sub-module may be configured for:

for each of the at least one video frame group, determining target video frames in this video frame group by:

determining $T4*\Delta P2/D4$ video frames from this video frame group as target video frames.

Figure 4:
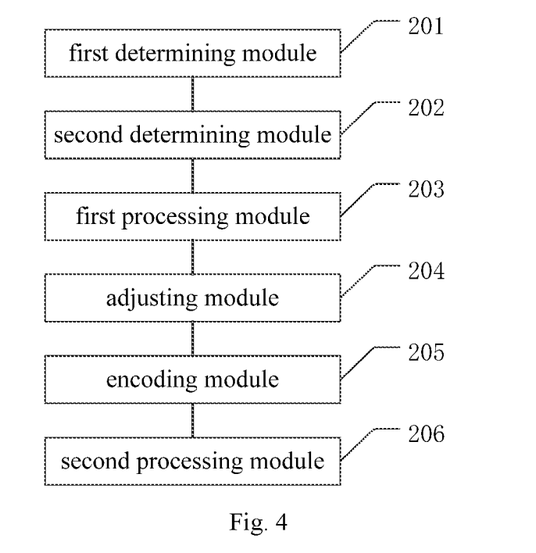
FIG. 4 is a schematic structural diagram of an apparatus for adjusting a playing speed of a video according to another embodiment of the present application.

FIG. 4 is a schematic structural diagram of an apparatus for adjusting a playing speed of a video according to another embodiment of the present application. In addition to the first determining module 201, the second determining module 202, the first processing module 203 and the adjusting module 204 in FIG. 3, the apparatus further includes an encoding module 205 and a second processing module 206.

The encoding module 205 is configured for obtaining a target adjusted video by encoding the target video whose timestamps have been adjusted completely.

The second processing module 206 is configured for storing and/or outputting the target adjusted video.

In summary, by applying the embodiment provided in FIG. 4, the target video whose timestamps have been adjusted completely can be re-encoded for further storage and output. In this way, when the user opens the target adjusted video next time, the previous adjusted effect can be directly obtained without adjusting the target video, which is very convenient for the user, and thus improve the user experience.

In addition, corresponding to the above method for adjusting a playing speed of a video, the present application provides a storage medium for storing executable codes, wherein the executable codes perform, when executed, the method for adjusting a playing speed of a video according to the embodiments of the present application. Specifically, the method for adjusting a playing speed of a video includes:

after detecting a playing speed adjustment instruction of a target video, determining a target playing speed corresponding to the playing speed adjustment instruction;

determining an initial frame rate of the target video, and taking the product of the initial frame rate and the target playing speed as a target parameter of the target video;

processing the target video based on a preset frame number adjustment rule corresponding to a target comparison relationship, wherein, the target comparison relationship is a comparison relationship between the target parameter and a preset target frame rate; and adjusting timestamps of video frames contained in the processed target video, based on the preset target frame rate, so that the adjusted target video is played in the preset target frame rate.

In the embodiment, the storage medium stores an application program that performs the method for adjusting a playing speed of a video according to the embodiments of the present application when being executed. In view of this, after the playing speed of the target video is adjusted, the adjusted target video can be played in the preset target frame rate, which can avoid that the number of video frames displayed in equal time periods is different, improve the display quality of a video whose playing speed has been adjusted, and improve the user experience.

In addition, corresponding to the above method for adjusting a playing speed of a video according to the embodiment of the present application, an embodiment of the present application provides an application program, which performs the method for adjusting a playing speed of a video according to the embodiments of the present application when being executed. Specifically, the method for adjusting a playing speed of a video includes:

after detecting a playing speed adjustment instruction of a target video, determining a target playing speed corresponding to the playing speed adjustment instruction;

determining an initial frame rate of the target video, and taking the product of the initial frame rate and the target playing speed as a target parameter of the target video;

processing the target video based on a preset frame number adjustment rule corresponding to a target comparison relationship, wherein, the target comparison relationship is a comparison relationship between the target parameter and a preset target frame rate; and adjusting timestamps of video frames contained in the processed target video, based on the preset target frame rate, so that the adjusted target video is played in the preset target frame rate.

In the embodiment, the application program performs the method for adjusting a playing speed of a video according to the embodiments of the present application when being executed. In view of this, after the playing speed of the target video is adjusted, the adjusted target video can be played in the preset target frame rate, which can avoid that the number of video frames displayed in equal time periods is different, improve the display quality of a video whose playing speed has been adjusted, and improve the user experience.

In addition, corresponding to the above method for adjusting a playing speed of a video according to the embodiment of the present application, an embodiment of the present application provides a video playing device, including: a processor and a memory.

The memory stores executable program codes.

The processor, by reading the executable program codes stored in the memory, executes a program corresponding to the executable program codes, to perform the method for adjusting a playing speed of a video according to the embodiment of the present application. Specifically, the method for adjusting a playing speed of a video includes:

after detecting a playing speed adjustment instruction of a target video, determining a target playing speed corresponding to the playing speed adjustment instruction;

determining an initial frame rate of the target video, and taking the product of the initial frame rate and the target playing speed as a target parameter of the target video;

processing the target video based on a preset frame number adjustment rule corresponding to a target comparison relationship, wherein, the target comparison relationship is a comparison relationship between the target parameter and a preset target frame rate; and adjusting timestamps of video frames contained in the processed target video, based on the preset target frame rate, so that the adjusted target video is played in the preset target frame rate.

The video playing device may include a device capable of playing a video, such as a smart phone, a tablet, and a desktop terminal.

In the embodiment, the processor of the video play device executes an application program corresponding to the executable codes by reading the executable codes stored in the memory. The application program performs the method for adjusting a playing speed of a video according to the embodiment of the present application when being executed. In view of this, after the playing speed of the target video is adjusted, the adjusted target video can be played in the preset target frame rate, which can avoid that the number of video frames displayed in equal time periods is different, improve the display quality of a video whose playing speed has been adjusted, and improve the user experience.

The embodiments of the video playing device, the application program, and the storage medium are described briefly since they are substantially similar to the embodiment of the method. Related contents can refer to the part that describes the embodiment of the method.

It should be noted that the relationship terms used here, such as "first," "second," and the like are only used to distinguish one entity or operation from another entity or operation, but do not necessarily require or imply that there is actual relationship or order between these entities or operations. Moreover, the terms "include," "comprise," or any variants thereof are intended to cover a non-exclusive inclusion, such that processes, methods, articles, or devices, including a series of elements, include not only those elements that have been listed, but also other elements that have not specifically been listed or the elements intrinsic to these processes, methods, articles, or devices. Without further limitations, elements limited by the wording "comprise(s) a/an . . . " and "include(s) a/an . . . " do not exclude additional identical elements in the processes, methods, articles, or devices, including the listed elements.

All of the embodiments in the description are described in a correlated manner, and identical or similar parts in various embodiments can refer to one another. In addition, the description for each embodiment focuses on the differences from other embodiments. In particular, the embodiment of the system is described briefly, since it is substantially similar to the embodiment of the method, and the related contents can refer to the description of the embodiment of the method.

The embodiments described above are simply preferable embodiments of the present application, and are not intended to limit the scope of protection of the present application. Any modifications, alternatives, improvements, or the like within the spirit and principle of the present application shall be included within the scope of protection of the present application.

The invention claimed is:

1. A method for adjusting a playing speed of a video, comprising:

after detecting a playing speed adjustment instruction of a target video, determining a target playing speed corresponding to the playing speed adjustment instruction;

determining an initial frame rate of the target video, and taking the product of the initial frame rate and the target playing speed as a target parameter of the target video;

processing the target video based on a preset frame number adjustment rule corresponding to a target comparison relationship, wherein, the target comparison relationship is a comparison relationship between the target parameter and a preset target frame rate; and adjusting timestamps of video frames contained in the processed target video, based on the preset target frame rate, so that the adjusted target video is played in the preset target frame rate, wherein, processing the target video based on a preset frame number adjustment rule corresponding to a target comparison relationship, comprises:

if the target parameter is smaller than the preset target frame rate, increasing the number of video frames in the target video based on the preset frame number adjustment rule;

if the target parameter is larger than the preset target frame rate, decreasing the number of video frames in the target video based on the preset frame number adjustment rule; and if the target parameter is equal to the preset target frame rate, retaining the number of video frames in the target video unchanged, and wherein, increasing the number of video frames in the target video based on the preset frame number adjustment rule, comprises:

calculating the number of added frames per second, wherein, the number of added frames is a difference between the preset target frame rate and the target parameter;

calculating a frame adding processing unit based on the target parameter and the number of added frames;

dividing the target video into at least one video frame group based on the frame adding processing unit;

determining target video frames from the at least one video frame group, based on the number of added frames and the frame adding processing unit; and adding a transition video frame after each determined target video frame, the transition video frame being a video frame generated based on this determined target video frame.

2. The method according to claim 1, wherein, calculating a frame adding processing unit based on the target parameter and the number of added frames, comprises:

calculating the greatest common divisor D1 of $T1*P_m$ and $T1*\Delta P1$, wherein, T1 is the smallest natural number that allows $T1*P_m$ and $T1*\Delta P1$ to be integers at the same time, $P_m$ is the target parameter, and $\Delta P1$ is the number of the added frames; and determining $T1*P_m/D1$ as the frame adding processing unit.

3. The method according to claim 2, wherein, determining target video frames from the at least one video frame group, based on the number of added frames and the frame adding processing unit, comprises:

for each of the at least one video frame group, determining target video frames in this video frame group by:

determining whether a first number of frames to be added is smaller than or equal to the frame adding processing unit, the first number of frames to be added being $T1*\Delta P1/D1$;

if the first number of frames to be added is smaller than or equal to the frame adding processing unit, determining the first number of video frames from this video frame group as target video frames; and if the first number of frames to be added is not smaller than or equal to the frame adding processing unit, determining all the video frames contained in this video frame group as first target video frames, updating the first number of frames to be added based on a difference between the first number of frames to be added and the frame adding processing unit, and determining whether the updated first number of frames to be added is smaller than or equal to the frame adding processing unit; if the updated first number of frames to be added is smaller than or equal to the frame adding processing unit, determining the updated first number of video frames from this video frame group as second target video frames, and determining all of the determined first target video frames and the determined second target video frames as target video frames; if the updated first number of frames to be added is not smaller than or equal to the frame adding processing unit, returning to the step of determining all the video frames contained in this video frame group as first target video frames.

4. The method according to claim 1, wherein, calculating a frame adding processing unit based on the target parameter and the number of added frames, comprises:

calculating the greatest common divisor D2 of $P_m$ and $\Delta P1$, wherein, $P_m$ is the target parameter, and $\Delta P1$ is the number of added frames; and determining $T2*P_m/D2$ as the frame adding processing unit, wherein, T2 is the smallest natural number that allows $T2*P_m/D2$ and $T2*\Delta P1/D2$ to be integers at the same time.

5. The method according to claim 4, wherein, determining target video frames from the at least one video frame group, based on the number of added frames and the frame adding processing unit, comprises:

for each of the at least one video frame group, determining target video frames in this video frame group by:

determining whether a second number of frames to be added is smaller than or equal to the frame adding processing unit, the second number of frames to be added being $T2*\Delta P1/D2$;

if the second number of frames to be added is smaller than or equal to the frame adding processing unit, determining the second number of video frames from this video frame group as target video frames; and if the second number of frames to be added is not smaller than or equal to the frame adding processing unit, determining all the video frames contained in this video frame group as third target video frames, updating the second number of frames to be added based on a difference between the second number of frames to be added and the frame adding processing unit, and determining whether the updated second number of frames to be added is smaller than or equal to the frame adding processing unit; if the updated second number of frames to be added is smaller than or equal to the frame adding processing unit, determining the updated second number of video frames from this video frame group as fourth target video frames, and determining all of the determined third target video frames and the determined fourth target video frames as target video frames; if the updated second number of frames to be added is not smaller than or equal to the frame adding processing unit, returning to the step of determining all the video frames contained in this video frame group as third target video frames.

6. The method according to claim 1, wherein, decreasing the number of video frames in the target video based on the preset frame number adjustment rule, comprises:
calculating the number of removed frames per second, wherein, the number of removed frames is a difference between the preset target frame rate and the target parameter;
calculating a frame removing processing unit based on the target parameter and the number of removed frames;
dividing the target video into at least one video frame group based on the frame removing processing unit;
determining target video frames from the at least one video frame group, based on the number of removed frames and the frame removing processing unit; and
removing the determined target video frames.

7. The method according to claim 6, wherein, calculating a frame removing processing unit based on the target parameter and the number of removed frames, comprises:
calculating the greatest common divisor D3 of $T3*P_m$ and $T3*\Delta P2$; wherein, T3 is the smallest natural number that allows $T3*P_m$ and $T3*\Delta P2$ to be integers at the same time, $P_m$ is the target parameter, and $\Delta P2$ is the number of removed frames; and
determining $T3*P_m/D3$ as the frame removing processing unit.

8. The method according to claim 7, wherein, determining target video frames from the at least one video frame group, based on the number of added frames and the frame adding processing unit, comprises:
for each of the at least one video frame group, determining target video frames in this video frame group by:
determining $T3*\Delta P2/D3$ video frames from this video frame group as target video frames.

9. The method according to claim 6, wherein, calculating a frame removing processing unit based on the target parameter and the number of removed frames, comprises:
calculating the greatest common divisor D4 of $P_m$ and $\Delta P2$, wherein, $P_m$ is the target parameter, and $\Delta P2$ is the number of removed frames; and
determining $T4*P_m/D4$ as the frame removing processing unit, wherein, T4 is the smallest natural number that allows $T4*P_m/D2$ and $T4*\Delta P2/D4$ to be integers at the same time.

10. The method according to claim 9, wherein, determining target video frames from the at least one video frame group, based on the number of added frames and the frame adding processing unit, comprises:
for each of the at least one video frame group, determining target video frames in this video frame group by:
determining $T4*\Delta P2/D4$ video frames from this video frame group as target video frames.

11. The method according to claim 1, further comprising:
obtaining a target adjusted video by encoding the target video whose timestamps have been adjusted completely; and
storing and/or outputting the target adjusted video.

12. A non-transitory storage medium for storing executable codes, wherein the executable codes perform, when executed, the method for adjusting a playing speed of a video according to claim 1.

13. A video playing device, comprising a processor and a memory, wherein,
the memory stores executable program codes;
the processor, by reading the executable program codes stored in the memory, executes a program corresponding to the executable program codes, so as to perform operations of:
after detecting a playing speed adjustment instruction of a target video, determining a target playing speed corresponding to the playing speed adjustment instruction;
determining an initial frame rate of the target video, and taking the product of the initial frame rate and the target playing speed as a target parameter of the target video;
processing the target video based on a preset frame number adjustment rule corresponding to a target comparison relationship, wherein, the target comparison relationship is a comparison relationship between the target parameter and a preset target frame rate; and
adjusting timestamps of video frames contained in the processed target video, based on the preset target frame rate, so that the adjusted target video is played in the preset target frame rate,
wherein the processor is further caused to perform operations of:
if the target parameter is smaller than the preset target frame rate, increasing the number of video frames in the target video based on the preset frame number adjustment rule;
if the target parameter is larger than the preset target frame rate, decreasing the number of video frames in the target video based on the preset frame number adjustment rule; and
if the target parameter is equal to the preset target frame rate, retaining the number of video frames in the target video unchanged, and
wherein, the processor is further caused to perform operations of:
calculating the number of added frames per second, wherein, the number of added frames is a difference between the preset target frame rate and the target parameter;
calculating a frame adding processing unit based on the target parameter and the number of added frames;
dividing the target video into at least one video frame group based on the frame adding processing unit;
determining target video frames from the at least one video frame group, based on the number of added frames and the frame adding processing unit; and
adding a transition video frame after each determined target video frame, the transition video frame being a video frame generated based on this determined target video frame.

14. The video playing device according to claim 13, wherein the processor is further caused to perform operations of:
calculating the number of removed frames per second, wherein, the number of removed frames is a difference between the preset target frame rate and the target parameter;
calculating a frame removing processing unit based on the target parameter and the number of removed frames;
dividing the target video into at least one video frame group based on the frame removing processing unit;

determining target video frames from the at least one video frame group, based on the number of removed frames and the frame removing processing unit; and removing the determined target video frames.

15. The video playing device according to claim 13, wherein the processor is further caused to perform operations of:

obtaining a target adjusted video by encoding the target video whose timestamps have been adjusted completely; and storing and/or outputting the target adjusted video.

* * * * *